PLUG-IN ELECTRONIC CIRCUIT UNITS AND MOUNTING PANELS

Original Filed July 26, 1954

INVENTOR.
ALFRED S. KHOURI
BY
John W. Michael
ATTORNEY

United States Patent Office 3,059,152
Patented Oct. 16, 1962

3,059,152

PLUG-IN ELECTRONIC CIRCUIT UNITS AND MOUNTING PANELS

Alfred S. Khouri, Milwaukee, Wis., assignor to Globe-Union Inc., Milwaukee, Wis., a corporation of Delaware

Continuation of application Ser. No. 445,593, July 26, 1954. This application Feb. 5, 1959, Ser. No. 792,252
3 Claims. (Cl. 317—101)

This invention relates to improvements in electronic circuit units and mounting panels and particularly to the leads for such units and the manner in which such leads are plugged in and secured to such panels. This application is a continuation of the application of Alfred S. Khouri, Serial No. 445,593, filed July 26, 1954, and now abandoned.

Units of this type consist of an insulating body which carries various arrangements of impedance elements to form desired circuits (see U. S. Patent 2,566,666 for one example). Heretofore, such units had flexible leads by which they were connected in a system with other circuit units and circuit components. However, the assembly and soldering required is tedious and expensive and did not permit standardization and easy replacement.

It is the object of this invention to provide such units and mounting panels which may be easily and quickly located and assembled and simply and securely soldered to both sides of the panel.

This object is obtained by providing the plug-in unit with tab leads having a longitudinally tapered or wedge-like section and a mounting panel with holes spacedly alined with such leads. The tab leads are easily located with respect to and inserted into such holes. The tapered or wedge-like sections make a sturdy preliminary jam-fit with the holes to secure the unit for subsequent soldering. The tapered sections are spaced from the side of the unit so that the side of the unit is spaced from such plate to permit the solder to make connection to either or both sides of the panel.

The characteristics and applications of this invention may be best understood by the following description of a specific embodiment when read in connection with the accompanying drawings, in which:

FIG. 1 is a view in perspective of an electronic circuit unit and mounting plate embodying the present invention, the unit being shown positioned above the plate before plug-in;

FIG. 2 is an enlarged fragmentary view partly in section and partly in side elevation of such unit and mounting plate assembled and soldered; and FIG. 3 is an enlarged fragmentary bottom plan view taken from the line 3—3 of FIG. 2.

Figures 1, 2, 3:
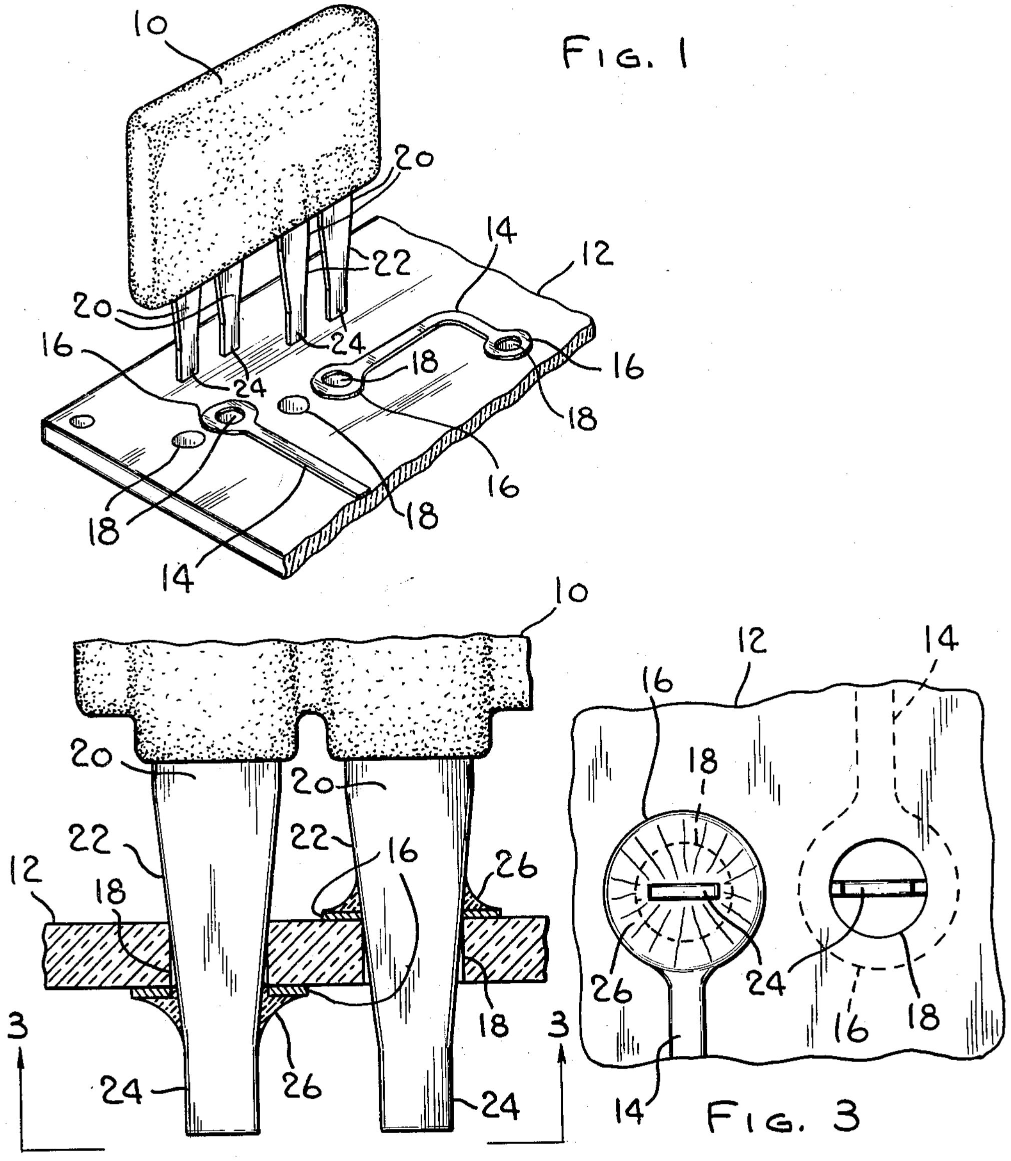

The electronic circuit unit 10 is constructed and tab leads hereinafter described are secured thereto in a manner well known to those skilled in the art of printed and etched circuits. As shown, the unit is covered with a protecting covering with the tab leads projecting. The tab leads may be secured to the circuitry on either side or on opposite sides of the unit 10. As is visible in FIG. 1 one pair of leads lies in a different plane than the other pair. However, to obtain standardization the leads are spaced equally longitudinally of the unit, say for example .172 in. center to center. The leads are identical in construction. Each has a wide upper section 20 and a narrow lower or end section 24 connected by a tapered section 22. The section 22 is tapered longitudinally and has opposite edges sloping upwardly and outwardly forming a wedge. While it is not necessary, it is advantageous to make the tabs from flat brass stock, preferably silver plated to make soldering easy. The stock should be as thin as is practical to conserve cost, however, it must be of sufficient thickness to provide proper support for the unit 10. Thicknesses in the vicinity of .010 in. have been found satisfactory. In this example the upper section 20 is about .076 in. wide and the end section 24 is about .045 in. wide to provide the edges of the tapered section 22 with a slope of approximately 12° to vertical.

An insulating mounting panel 12 (which may be a wall of a chassis) has on opposite faces thereof non-crossing conductive paths 14 with enlarged areas 16 encircling holes 18 passing through the panel 12. While these holes are shown circular, they may also be square. The circular holes are offset to properly aline with respective leads on the unit 10. The square holes are wide enough to span the distance between offset leads and hence may be arranged in one plane. It is also common practice to mount the conductive paths on one side only of panel and this invention is applicable to either arrangement.

The unit 10 is installed on the panel 12 by inserting the ends 24 in the holes 18 with which they are alined and pressing the unit 10 down until the edges of the tapered section 22 wedge with the edges of such holes. This wedging action is sufficient to jam-fit the tab leads in the holes 16 to hold the unit 10 and support it during subsequent soldering. It is desirable to dimension the holes 18 to approximately 1/16 in. diameter or square so that the wedging action will take place when the longitudinal centers of the tapered sections 22 are close to the holes 18. Thus the unit 10 is spaced from the surface of the panel 12. With the unit 10 so held, the panel 12 is dipped in a solder bath and fillets of solder 26 will form between the enlarged areas 16 and the tab leads on either one or both sides of the panel 12. Hence, in one soldering operation connections are made simultaneously between the tab leads and the conductive paths 14 on the base 12. The taper will further permit solder to enter in the holes 18 if there is any metalizing on such holes to which it will adhere.

What I claim and desire to secure by this patent is:

1. In combination a panel having a plurality of holes therein, conductors bonded to a surface of said panel with portions thereof adjacent the edges of said holes, an electronic unit having a plurality of tab leads extending therefrom, said holes and said leads longitudinally of said unit being equally spaced from center to center, said leads being tapered longitudinally and having outer ends smaller than said holes and having transverse sections adjacent to said unit larger than said hole, said tapered sections extending beyond opposite sides of said panel and being in frictional engagement with the edges of said holes to space and hold said unit from said panel for soldering operations, and fillets of solder connecting said tab leads with said adjacent conductive paths.

2. The combination with an insulating mounting panel having holes therein and conductors bonded to the surface of said panel adjacent said holes, of an electronic unit having flat tab leads secured thereto and projecting through said holes, said leads being tapered longitudinally and having outer ends smaller than said holes and having transverse sections adjacent to said unit larger than said holes in frictional engagement with the edges of said holes, said tapered sections extending beyond opposite sides of said panel to space said unit from said panel and provide space so that when said panel is dipped in a solder bath fillets of solder will form on both sides of said panel, and fillets of solder joining said leads and said conductors.

3. In combination a panel having a plurality of holes therein, non-crossing conductive paths on opposite sides of said panel with portions thereof adjacent the edges of said holes, an electronic unit having a plurality of flat tab leads extending therefrom, said holes and said leads longitudinally of said unit being equally spaced from center to center, said leads being tapered longitudinally and having outer ends smaller than said holes and having transverse sections adjacent to said unit larger than said holes, said tapered sections extending beyond opposite sides of said panel and being in frictional engagement with the edges of said holes to hold said unit for soldering operations, and fillets of solder connecting said tab leads with adjacent conductive paths.

References Cited in the file of this patent

UNITED STATES PATENTS 2,069,633 Tripp ---------- Feb. 2, 1937

2,244,009 Hiensch ---------- June 3, 1941
2,650,415 Kingman ---------- Sept. 1, 1953
2,700,150 Wales ---------- Jan. 18, 1955
2,816,275 Hammel ---------- Dec. 10, 1957

OTHER REFERENCES

Tele-Tech and Electronic Industries, November 1953, page 47.